May 29, 1962 K. R. HAGEN 3,036,746
DISPENSING APPARATUS
Filed Oct. 9, 1959 2 Sheets-Sheet 1
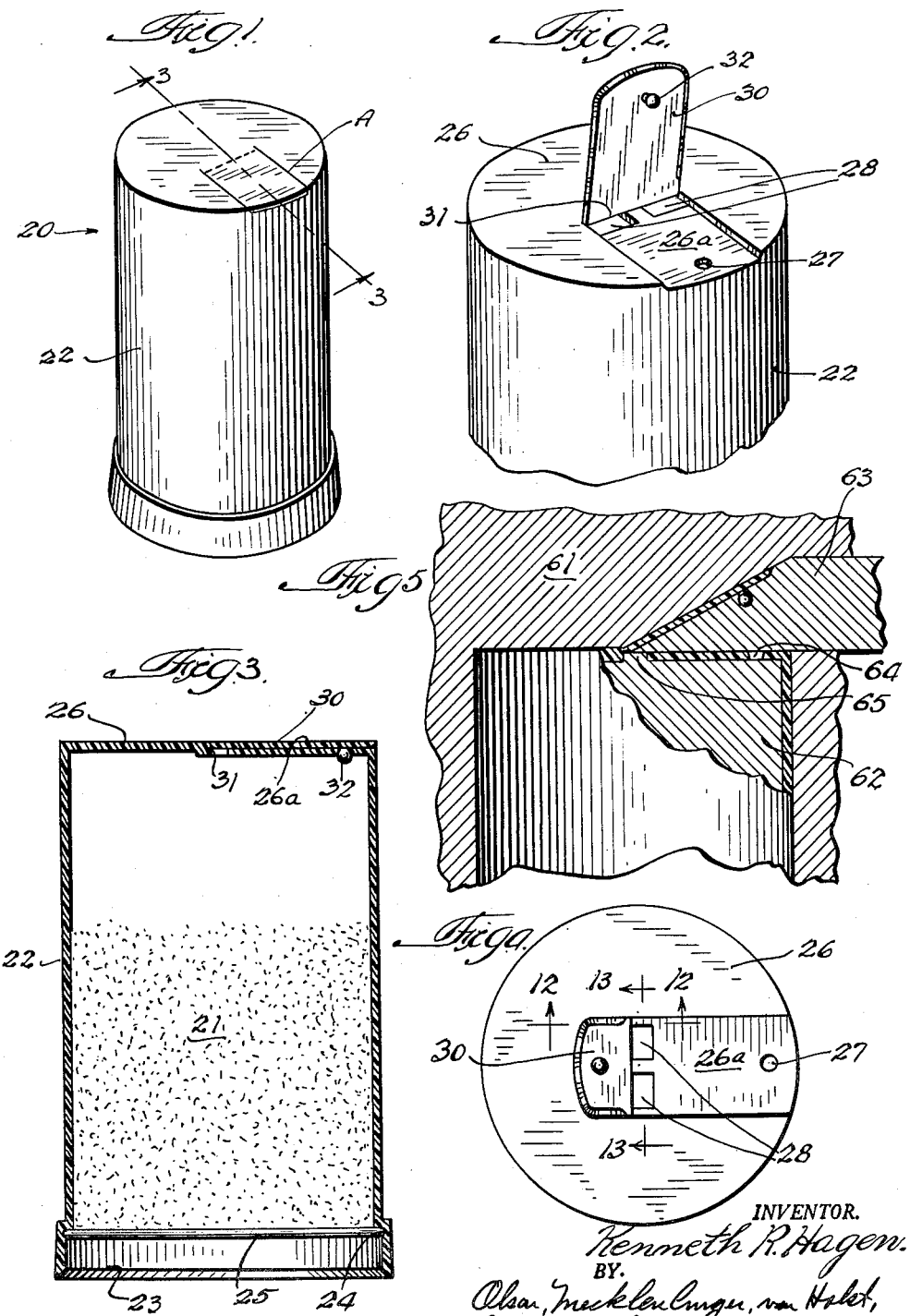
INVENTOR.
Kenneth R. Hagen.

May 29, 1962 — K. R. HAGEN — 3,036,746
DISPENSING APPARATUS
Filed Oct. 9, 1959 — 2 Sheets-Sheet 2
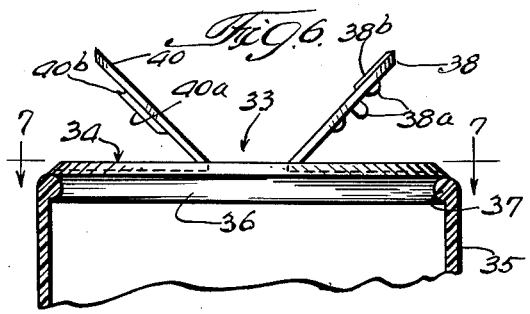
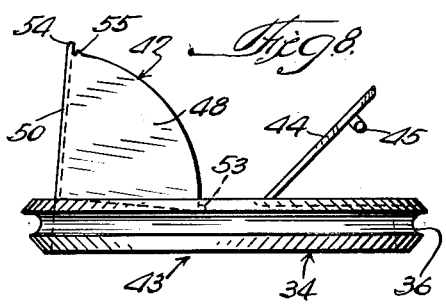
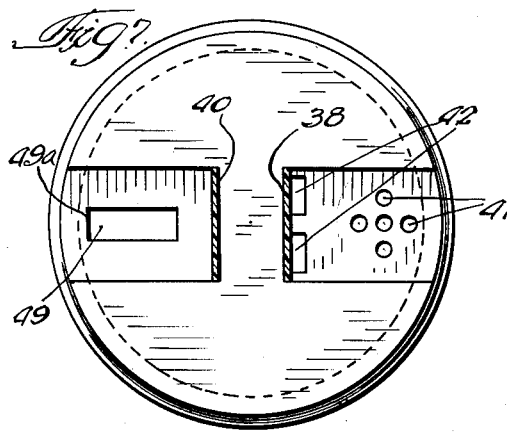
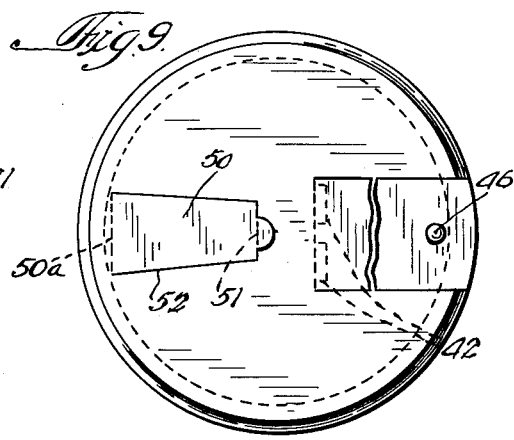
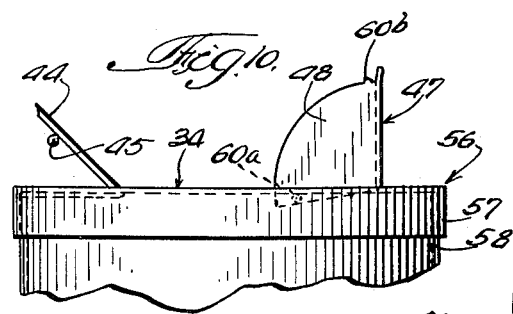
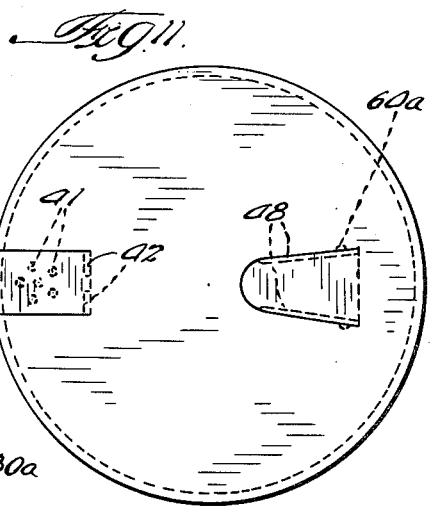
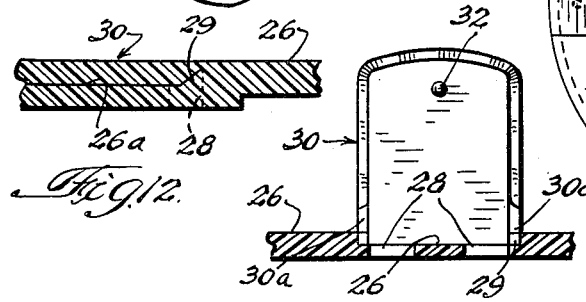
INVENTOR.
Kenneth R. Hagen United States Patent Office 3,036,746
Patented May 29, 1962

3,036,746
DISPENSING APPARATUS
Kenneth R. Hagen, Shelburn, Ind., assignor to Morton Salt Company, Chicago, Ill., a corporation of Illinois
Filed Oct. 9, 1959, Ser. No. 845,479
4 Claims. (Cl. 222—480)

This invention relates to a dispensing apparatus and more particularly to an apparatus for dispensing granular products such as table salt, ground pepper, or liquid products such as detergents.

Various apparatus of this type have heretofore been proposed which, because of design, are possessed of one or more of the following shortcomings: First, such apparatus is of costly and complex construction; second, it is awkward to manipulate; third, it is susceptible to ready clogging and is not capable of permitting controlled dispensing of the product; fourth, it is exceedingly difficult to effectively close off the dispensing opening when the apparatus is not in use; and lastly, such apparatus is of delicate construction and not possessed of an aesthetic appearance.

Thus, it is one of the objects of this invention to provide a dispensing apparatus which overcomes the aforementioned shortcomings.

Further and additional objects will appear from the description, accompanying drawings, and appended claims.

In accordance with one embodiment of this invention, a dispensing apparatus is provided which is formed of molded material. The apparatus includes a planar surface provided with an aperture through which a product is caused to pass. A cover piece is provided which has a segment of its periphery integrally connected to the surface adjacent one side of the aperture. The cover piece is mounted to hinge about the integrally connected peripheral segment as an axis. The cover piece, when in one position of hinged adjustment, is adapted to overlie and close off the surface aperture.

For a more complete understanding of this invention, reference should be made to the drawings, wherein:

FIGURE 1 is a perspective view of one form of the invention, showing the cover piece in a closed position;

FIG. 2 is an enlarged fragmentary perspective view of FIG. 1, showing the cover piece in an open position;

FIG. 3 is a sectional view taken along line 3—3 of FIG. 1;

FIG. 4 is a top plan view of FIG. 3, showing the cover piece in an open position;

FIG. 5 is an enlarged fragmentary vertical sectional view, showing the apparatus of FIG. 1 disposed in the forming mold;

FIG. 6 is an enlarged fragmentary vertical sectional view of a second form of the invention, shown assembled in the end of a container;

FIG. 7 is a view taken along line 7—7 of FIG. 6;

FIG. 8 is a side elevational view similar to FIG. 6, showing a third form of the invention;

FIG. 9 is a top plan view of FIG. 8, showing the cover pieces in closed positions and the right-hand cover piece partially cut away;

FIG. 10 is an enlarged fragmentary side elevational view of a fourth form of the invention shown assembled on a container;

FIG. 11 is a top plan view of FIG. 10, showing the cover pieces in closed positions;

FIG. 12 is an enlarged fragmentary sectional view taken along line 12—12 of FIG. 4, but showing the cover piece in a closed position; and FIG. 13 is an enlarged fragmentary sectional view taken along line 13—13 of FIG. 4.

Referring now to the drawings and more particularly to FIGS. 1–4, an improved dispensing apparatus 20 is shown for use in dispensing granular products such as table salt, ground pepper, or liquid products, such as detergents and the like. The description to follow, however, will be confined to a granular product.

The product 21, in this instance, is packaged within a cylindrically-shaped body section 22. The lower end 23 of body section 22 is open and is provided with an internal annular continuous groove 24 spaced a short distance above the end 23. Removably positioned within the groove 24 is a disc-shaped plug 25 which is adapted to be inserted following the body section 22 being filled with the product 21. The opposite end of body section 22 is provided, in this instance, with a planar surface 26. The surface 26 is provided with a recessed area 26a in which there is formed an opening 27 disposed adjacent the periphery of the surface and a pair of elongated openings 28 spaced a greater distance from the periphery of such surface. The openings 28, in this instance, are in longitudinally spaced relation with respect to one another.

Surface 26 is provided with a cover piece 30 which has a segment of its periphery 31 integrally connected to a portion of surface 26, whereby the cover piece is adapted to hinge about segment 31 as an axis into an overlying relation with respect to surface area 26a. The portion of surface 26 to which the cover piece is connected forms an elongated side of each of the pair of openings 28, for a purpose to be hereinafter described. When the cover piece is in the position A, as shown in FIG. 1, the openings 27 and 28 are closed off by the cover piece 30. To insure that cover piece 30 is completely closed, so that it is flush with the exposed side of surface 26, the pair of openings 28 prevent the accumulation of any of the product 21 at the hinged axis of the cover piece. Cover piece 30 is provided on its underside with a protuberance 32 (see FIG. 2) which, when the piece is in position A, is frictionally disposed within the opening 27 and effects locking of the cover piece in such position.

It will be noted that the marginal edge portion of three sides of the cover piece 30 are bevelled from the underside, so as to facilitate positioning of the cover piece in flush relation with the container top 26. In FIG. 13 it will be observed that the bevel on the two opposite sides is foreshortened a slight amount so that two pluglike elements 30a are formed adjacent the hinged side of the piece and thus prevent any leakage of the product along the margin of the piece 30 when it is in a closed position. As a further means of preventing such leakage, it will be seen in FIG. 12 that a small fillet 29 is formed along the periphery of the recessed area 26a, adjacent the segment 31 thereof, so that when the cover piece 30 is closed it will be in direct contact with such fillet 29 and provide a seal.

The apparatus 20 is preferably formed of a thermoplastic material such as, for example, polyethylene. The method of forming such apparatus will be described in greater detail hereinafter. It is to be noted that the size and shape of apparatus 20 may vary widely from that shown without departing from the scope of this invention.

FIGS. 6 and 7 disclose a modified form of the apparatus 33. In this form the apparatus comprises a planar element or surface 34 which is adapted to be inserted within an open end of a cylindrically-shaped body member 35. The body member 35, in this instance, may be formed of a cardboard material or the like. The planar member 34 is provided with a peripheral groove 36 which is adapted to snugly accommodate an internal rib or crimped body 37 delimiting the body member open end. Thus the rib, when disposed within the groove 36, prevents accidental disassembly of the member 34 from the body member 35, even though the latter is shaken vigorously during use.

Formed integrally with member 34, in substantially the same manner as cover piece 30, are a pair of cover pieces 38 and 40. The cover piece 38, when in a closed position, is adapted to overlie and close off two sets of apertures 41 and 42 formed in planar member 34 (see FIG. 7). These sets of apertures, as is the case with openings 27 and 28 of apparatus 20, are for the purpose of permitting discharge of the product therethrough. Cover piece 38 is provided on its underside with a plurality of protuberances 38a (see FIG. 6) which are adapted to be frictionally accommodated within apertures 41 when the cover piece is in its closed position. The elongated apertures 42 serve the same function as the elongated openings 28 of apparatus 20, in that they prevent the accumulation of any product adjacent the hinged axis of the cover piece and thus insure that the piece can be manipulated into its closed position.

Apparatus 33 is provided with an additional elongated aperture 49 which is formed in planar member 34 and in substantially diametrically opposed relation with respect to apertures 41. Cover piece 40 is adapted to overlie and close off aperture 49. The size and shape of aperture 49, in this instance, is such as to permit a single large stream of product to be discharged. Cover piece 40 has formed on its underside an elongated protuberance 40a which is provided with a longitudinally extending tongue 40b. The tongue 40b is adapted to resiliently interlock with a peripheral segment 49a of aperture 49 and thus prevent accidental opening of the cover piece. Cover piece 38 may, if desired, be provided with an elongated rib 38b formed on its exposed surface adjacent the outer free edge of such piece and thus provide stiffness for the cover piece so as to facilitate manipulation of the cover piece from a closed position to an open position.

FIGS. 8 and 9 disclose another embodiment of the improved apparatus 43 which is similar to apparatus 33, except that the cover piece 44 is like cover piece 30 and, in place of the second cover piece 40, as described for apparatus 33, there is provided a pouring spout 47 which comprises a pair of quadrantal sides 48 which are interconnected by a base or web portion 50. The base portion 50 and sides 48 are of one-piece construction and the angular disposition thereof is effected at the time of molding the spout. One end of the base 50 is integrally connected to the planar surface 34, and such connection serves as the pivotal axis for the spout 47. The sides 48 of spout 47 are adapted to be accommodated within an elongated aperture 52 formed in the planar member 34. The shape of base portion 50 conforms substantially to the shape of the aperture 52. Adjacent the free edge of each side 48 is a lug 53 (see FIG. 8), which is adapted to function as a stop, so as to prevent opening of the spout beyond a certain point. Base member 50 is provided with a peripheral finger tab 54 opposite the pivotal axis, to facilitate manipulation of the spout from a closed position to an open position. Adjacent tab 54, and formed on the arcuate periphery of each side 48, is a second lug 55 which is adapted to cooperate with the planar member 34 and resiliently lock the spout in a closed position.

FIGS. 10 and 11 disclose a further modification 56 of the apparatus which is similar to form 43, except that the planar member 34 is provided with an annular depending flange 57 which is adapted to encompass the end of a cylindrically-shaped body member 58. In this instance, the planar member 34 may be adhesively affixed or heat sealed to the open end of a cylindrically-shaped container 58. Sides 48 are provided with two sets of detents 60a and 60b, see FIG. 10. Detents 60a limit the extent to which the spout 47 can be moved to an open position. Detents 60b, on the other hand, lock the spout in a closed position.

Heretofore, in the fabrication of dispensing apparatus of a type such as shown in FIG. 1 formed of either cardboard or plastic material, numerous operational steps are involved: For example in a cardboard dispensing apparatus, a cardboard cylindrical member open at opposite ends is initially formed; annular discs to close off the ends of the cylinder member are then formed and the bottom disc applied to the lower end of the cylinder member. Prior to applying the other disc to the cylinder member, the latter is filled with the desired product and, in addition, the pouring spout and shifting devices are mounted on such top disc. After the discs are applied to the cylinder member, an identifying label is affixed in encompassing relation on the exposed surface of the cylinder member. In all, it is customary that fabrication of such a device involves numerous operational steps, which are costly as well as time consuming. In addition to these drawbacks, it is difficult to make the device leakproof as well as moistureproof, because of shrinkage of material, etc.

With applicant's device shown in FIG. 1, these difficulties have been avoided by reason of the fact that the entire container, except for the plug 25, is of one-piece construction and formed of a thermoplastic material in one operation, namely, by injection molding. It is to be understood, of course, that other methods of fabrication might be utilized. In FIG. 5 there is shown, diagrammatically, the injection molding operation. A female cavity 61 is provided in which the plastic is disposed, and then a male member 62 is inserted within the female cavity to form the cylindrical body section 22 and planar surface 26 of the apparatus. In addition, there is provided a side core piece 63 which cooperates with a laterally disposed pocket in the female cavity 61, so as to form the cover piece 30, as shown in FIG. 2. The male member 62, at its leading end, is provided with protuberances 64 and 65 for forming the openings 27 and 28, respectively, in planar surface 26. Thus, upon male member 62 and core piece 63 being removed from the cavity 61, the dispensing apparatus is formed in its entirety, except for the placement of the plug 25. The plug 25 may be formed of any suitable material which is preferably moistureproof. Following removal of the apparatus from the mold, the cylindrical body section 22 may be printed, if desired, with any identifying indicia. The cover piece is then moved to its closed position A, and the apparatus inverted so as to permit filling of the body section 22 with the product 21. The plug 25 is then inserted within groove 24 and, because of the resilient character of the material utilized and the size of plug 25, the latter is resiliently retained in place.

The number of different pieces or pouring spouts to be formed in the apparatus, whether in the form shown in FIGS. 1, 8, or 10, may be simultaneously formed. The material utilized for forming the apparatus must be such as to have no deleterious effect on the product and preferably should be capable of being formed in a variety of shapes and sizes.

Thus, it will be seen that a simple, inexpensive dispensing apparatus has been provided, the fabrication of which is substantially accomplished by complete automation. In addition, the improved apparatus is devoid of the shortcomings, aforementioned, of the prior art devices.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A dispensing apparatus for a liquid or granular product comprising a hollow body for accommodating such product, and a molded planar surface wall affixed to said body, said wall including an apertured recessed area, an aperture of which permits the product to be dispensed therethrough from said body, and a hingedly mounted closure means having a peripheral segment thereof molded to a segment of the wall circumjacent said recessed area, the thickness of said closure means being substantially equal to the depth of recess of said recessed area, and less than the thickness of a portion of said wall circumjacent said recessed area, said closure means when in one position of hinged adjustment, being in substantially registered relation with said recessed area and closing off said aperture whereby the exposed surface of said closure means is substantially coplanar with the exposed surface of the remainder of said wall.

2. The apparatus recited in claim 1 wherein the body and planar surface wall are of molded one piece construction.

3. The apparatus recited in claim 1 wherein said aperture formed in said apertured recessed area is juxtaposed the wall segment molded to the peripheral segment of said closure means.

4. A dispensing apparatus for a liquid or granular product comprising a hollow body for accommodating such product, and a molded planar surface wall affixed to said body, said wall including a first apertured recessed area, an aperture of which permits the product to be dispensed therethrough in a fine stream from said body, a hingedly mounted first closure means having a peripheral segment thereof molded to a segment of the wall circumjacent said first recessed area, a second apertured recessed area spaced from said first recessed area, an aperture of said second apertured recessed area permitting the product to be dispensed therethrough in a large stream from said body, and a hingedly mounted second closure means having a peripheral segment thereof molded to a segment of the wall circumjacent said second recessed area; the thickness of said first closure means being substantially equal to the depth of recess of said first recessed area and less than the thickness of a portion of said wall circumjacent said first recessed area; each closure means, when in one position of hinged adjustment, being in substantially registered relation with its respective recessed area and closing off said aperture whereby the exposed surface of said closure means is substantially coplanar with the exposed surface of the remainder of said wall.

References Cited in the file of this patent

UNITED STATES PATENTS

| | | |
|---|---|---|
| 1,746,006 | Metzger | Feb. 4, 1930 |
| 2,041,185 | Jacobs | May 19, 1936 |
| 2,200,395 | Lobl | May 14, 1940 |
| 2,542,263 | Schultz | Feb. 20, 1951 |
| 2,583,211 | Fleming | Jan. 22, 1952 |
| 2,696,023 | Scott | Dec. 7, 1954 |
| 2,828,894 | Zimmerman | Apr. 1, 1958 |
| 2,886,218 | Marcus | May 12, 1959 |
| 2,904,226 | Gilbert | Sept. 15, 1959 |

FOREIGN PATENTS

| | | |
|---|---|---|
| 580,117 | Great Britain | Aug. 27, 1946 |